Dec. 16, 1924. 1,519,776
J. FAZEKAS ET AL
AGRICULTURAL IMPLEMENT
Filed May 21, 1923
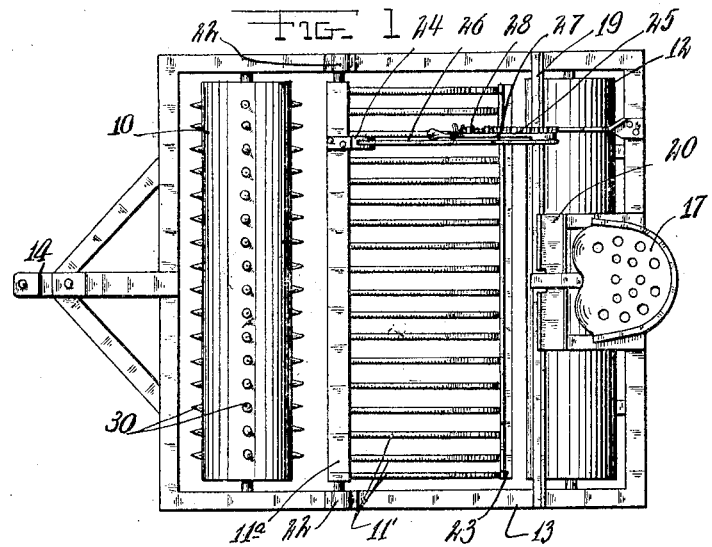
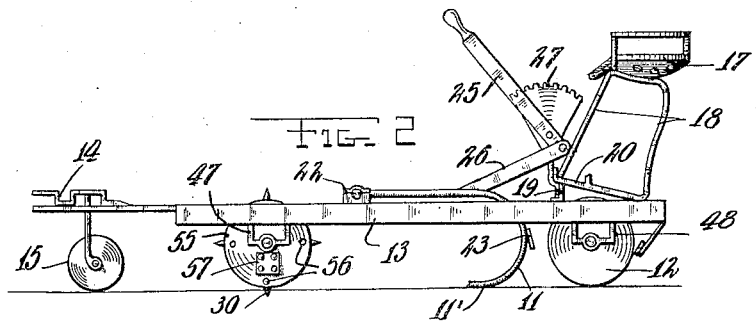
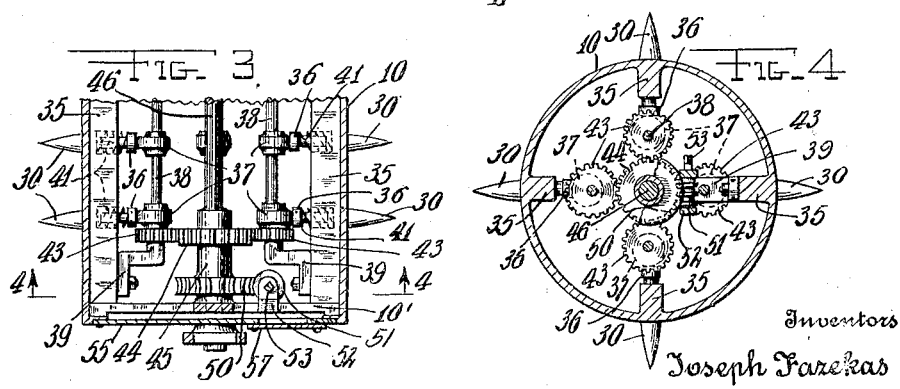
Inventors
Joseph Fazekas
Joseph Czvik
Attorney Patented Dec. 16, 1924.

1,519,776

UNITED STATES PATENT OFFICE.

JOSEPH FAZEKAS AND JOSEPH CZVIK, OF ST. PAUL, MINNESOTA.

AGRICULTURAL IMPLEMENT.

Application filed May 21, 1923. Serial No. 640,305.

*To all whom it may concern:*

Be it known that we, JOSEPH FAZEKAS and JOSEPH CZVIK, citizens of the United States, residing at St. Paul, in the county of Ramsey and State of Minnesota, have invented certain new and useful Improvements in Agricultural Implements, of which the following is a specification.

This invention relates generally to agricultural implements, having more particular reference to an agricultural implement for use in cultivating the ground.

The invention has for an object the provision of a novel implement of this type comprising a series of operating elements adapted to successively engage the ground as the implement travels thereover, a further specific object having reference to the provision of a novel means of adjustment of the teeth of one of the said elements.

For further comprehension of the invention, and of the objects and advantages thereof, reference will be had to the following description and accompanying drawings, and to the appended claims in which the various novel features of the invention are more particularly set forth.

Fig. 1 of the drawings is a plan view of our improved agricultural implement.

Fig. 2 is a side elevation thereof.

Fig. 3 is a fragmentary longitudinal sectional view of the lump breaking roller.

Fig. 4 is a transverse sectional view thereof, this view being taken on the line 4—4 of Fig. 3.

Briefly speaking our improved agricultural implement comprises a lump breaking roller 10, a rake 11, and a smoothing roller 12 arranged one in front of the other, and carried by a horizontally extended rectangular frame 13. This frame may be made of suitable metal angle bars and is provided at its front end with a forwardly projected element 14 to which suitable draft gear may be attached, this element also supporting a swingable wheel 15. The roller 10 is located at the front of the frame, the roller 12 at the rear, and the rake 11 between the two rollers. Above the roller 12 is the seat 17 which is supported on a pair of struts 18, one of which is fixed on the rear cross bar of the frame, and the other on a crosspiece 19 on the frame a short distance from the rear end of the latter, a foot rest 20 for the operator being provided.

The rake consists of a number of curved teeth 11' fixed to a bar 11$^a$ which is pivotally supported at its ends in bearing elements 22 on the frame 12. A reinforcing strip 23 also extends across the teeth at some distance from the bar 11$^a$, this strip being suitably fixed to the teeth 11'. For raising and lowering the rake the bar 11$^a$ is provided with a short rearwardly extending arm 24 to which is connected one end of a link 26 whose opposite end is connected to a hand lever 25 pivoted to an arcuate bracket 27 supported by the frame and the crosspiece, the lever having the usual locking bolt 28 adapted to engage the serrated edge of the bracket 27 to lock the rake in adjusted positions.

The roller 12 is of smooth cylindrical form, while the lump breaking roller 10 is provided with rows of pins 30 projecting therefrom to break up the lumps as the implement is drawn along the ground. We preferably arrange these pins 30 for radial adjustment, for accommodation to the nature of the ground being worked, on and to this end they are freely set in ribs 35 extending along the inner face of the roller wall and are formed on their inner ends with heads 36 against which bear disks 37 eccentrically fixed on shafts 38 extending longitudinally of the roller and supported at their ends by brackets such as 39 fixed to the ribs 35. The pins 30 are surrounded by coiled expansion springs 41 which bear on the heads 36 thereof and serve to keep the said heads pressed against the disks 37, which latter form cam elements.

For rotating these cam elements the shafts 38 have gears 43 fixed to one end which mesh with a common gear 44 fixed on one end of a short sleeve 45 freely surrounding the axle 46 of the roller, the axle being fixed with relation to the roller and suitably supported at its ends for rotation in bearing members 47 depending from the frame 10, similar bearing elements 48 being provided for the smooth roller 10. On the opposite end of the sleeve 45 is fixed a worm gear 50 engaged by a worm pinion 51 supported in bracket elements 52 extended from one of the spoke elements 10' of the roller, the pinion 51 having a squared trunnion 53 for receiving a rotating tool. In order to prevent access of dirt to the interior of the roller 10 it is closed at its ends by removable plates such as 55 which may be secured in place by screws 56, one of these plates having an opening therein, adjacent the pinion 51, which is closed by a removable supplementary plate or cover 57.

It is believed that the manner of operation and use of our improved agricultural implement will be readily understood from the above description, the machine traveling along the ground and the various implements acting successively thereon. When it is desired to adjust the pins 30, the small plate 57 is removed to permit of access to the trunnion 53 of pinion 51. If desired we may proportion the parts so that the pins 30 may be withdrawn if desired entirely within the confines of the roller, which could then operate both as an ordinary smoothing roller and as a lump breaking roller.

While we have illustrated and described a preferred embodiment of our invention it is to be understood that we do not limit ourselves to the precise construction herein disclosed and that various changes and modifications might be made therein without departing from the spirit and scope of the invention as defined in the appended claims.

Having thus described our invention what we claim as new and desire to protect by Letters Patent of the United States is as follows:

1. In an agricultural implement, a roller, a series of pins projecting therefrom, and means for adjusting said pins radially, comprising cam elements mounted within the roller and adapted to engage the inner ends of the pins, shafts on which said cam elements are fixed, and worm gear and pinion means for adjusting said shafts angularly.

2. In an agricultural implement, a roller, a series of pins projecting therefrom, and means for adjusting said pins radially, comprising cam elements mounted within the roller and adapted to engage the inner ends of the pins, shafts on which said cam elements are fixed, and worm gear and pinion means for adjusting said shafts angularly, said cams being in the form of disks eccentrically mounted on the said shafts.

3. In an agricultural implement, a cylindrical roller having a number of ribs extending along the inner face of the wall thereof, a series of pins slidably supported by each rib and projecting radially from the roller, springs engaged with said pins to urge the latter inwardly, a series of shafts extending parallel to the said ribs adjacent the latter, cams on said shafts adapted to engage the inner ends of said pins, gear pinions fixed on said shaft, a sleeve freely surrounding the said axle and having a gear on one end thereof meshing with all of said pinions, a worm gear fixed on said sleeve, and a worm pinion supported by the roller engaging said worm gear, said worm pinion adapted for manual rotation to adjust the said pins radially outward.

In testimony whereof we have affixed our signatures.

JOSEPH FAZEKAS.
JOSEPH CZVIK.